US009759804B2

(12) United States Patent
Lee et al.

(10) Patent No.: US 9,759,804 B2
(45) Date of Patent: Sep. 12, 2017

(54) METHOD AND APPARATUS FOR ESTIMATING 3D POSITION AND ORIENTATION THROUGH SENSOR FUSION

(75) Inventors: Hyong Euk Lee, Yongin-si (KR); Sang Hyun Kim, Hwaseong-si (KR); Won Chul Bang, Seongnam-si (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 813 days.

(21) Appl. No.: 13/465,428

(22) Filed: May 7, 2012

(65) Prior Publication Data

US 2012/0330594 A1      Dec. 27, 2012

(30) Foreign Application Priority Data

Jun. 22, 2011  (KR) .................. 10-2011-0060573

(51) Int. Cl.
*G01C 17/38*       (2006.01)
*G01S 5/16*        (2006.01)

(52) U.S. Cl.
CPC ........... *G01S 5/163* (2013.01); *G01S 5/16* (2013.01)

(58) Field of Classification Search
CPC .................................... G01S 5/163; G01S 5/16
(Continued)

(56) References Cited

U.S. PATENT DOCUMENTS 5,703,623 A * 12/1997 Hall et al. .................. 345/158
7,640,106 B1 * 12/2009 Stokar .................... G01C 21/16
                                                342/147

(Continued)

FOREIGN PATENT DOCUMENTS

JP      2007-163457      6/2007
JP      2010-38707       2/2010
(Continued)

OTHER PUBLICATIONS

Daniel Roetenberg, "Inertial and Magnetic Sensing of Human Motion", 2006.*
(Continued)

*Primary Examiner* — Toan Le
*Assistant Examiner* — Xiuquin Sun
(74) *Attorney, Agent, or Firm* — NSIP Law

(57) ABSTRACT

An apparatus and method for estimating a three-dimensional (3D) position and orientation based on a sensor fusion process is provided. The method of estimating the 3D position and orientation may include estimating a strength-based position and a strength-based orientation of a remote apparatus when a plurality of strength information is received, based on an attenuation characteristic of a strength that varies based on a distance and orientation, estimating an inertia-based position and an inertia-based orientation of the remote apparatus by receiving a plurality of inertial information, and estimating a fused position based on a weighted-sum of the strength-based position and the inertia-based position, and to estimate a fused orientation based on a weighted-sum of the strength-based orientation and the inertia-based orientation. The strength-based position and the strength-based orientation may be estimated based on a plurality of adjusted strength information from which noise is removed using a plurality of previous strength information.

21 Claims, 4 Drawing Sheets

(58) Field of Classification Search
USPC .......................................................... 702/94
See application file for complete search history.

(56) References Cited

U.S. PATENT DOCUMENTS

| | | | |
|---|---|---|---|
| 8,032,324 B1* | 10/2011 | Bryant et al. ................. | 702/141 |
| 2006/0239471 A1* | 10/2006 | Mao et al. ..................... | 381/92 |
| 2008/0259310 A1* | 10/2008 | Wada ....................... | G01C 3/06 |
| | | | 356/3.11 |
| 2009/0323121 A1* | 12/2009 | Valkenburg et al. ........ | 358/1.18 |
| 2011/0014981 A1* | 1/2011 | Mao et al. ..................... | 463/36 |
| 2012/0022785 A1* | 1/2012 | DiBernardo ............ | G01S 5/163 |
| | | | 701/514 |

FOREIGN PATENT DOCUMENTS

| | | |
|---|---|---|
| KR | 10-2005-0052555 | 6/2005 |
| KR | 10-2009-0072435 | 7/2009 |
| KR | 10-2009-0106767 | 10/2009 |
| KR | 10-2009-0112800 | 10/2009 |
| KR | 10-2011-0025027 | 3/2011 |
| KR | 10-2011-0030639 | 3/2011 |

OTHER PUBLICATIONS

Welch et al., "An Introduction to the Kalman Filter", Jul. 24, 2006, http://www.cs.unc.edu/~welch/media/pdf/kalman_intro.pdf.*
Peter Maybeck, "Stochastic models, estimation, and control", 1979, Academic Press, Inc., vol. 1, p. 1-16.*

* cited by examiner

METHOD AND APPARATUS FOR ESTIMATING 3D POSITION AND ORIENTATION THROUGH SENSOR FUSION

CROSS-REFERENCE TO RELATED APPLICATIONS

This application claims the priority benefit of Korean Patent Application No. 10-2011-0060573, filed on Jun. 22, 2011, in the Korean Intellectual Property Office, the disclosure of which is incorporated herein by reference.

BACKGROUND

1. Field

Example embodiments of the following description relate to a method and apparatus for estimating a three-dimensional (3D) position and orientation based on a sensor fusion process and, more particularly, to a method and apparatus for estimating 3D position and orientation by fusing a result of estimation based on strength information and a result of estimation based on inertial information.

2. Description of the Related Art

Conventionally, techniques that estimate a three-dimensional (3D) position and orientation of a moving object or target have been used in the film, graphic and animation industries, and the like, for sensing motion of an object, a human body, an animal, and the like, in a 3D space using an expensive and large-sized motion capturing device.

As motion sensing techniques for consumer electronics (CE) associated with the game industry have begun to draw attention, many 3D position and orientation estimating methods using an inexpensive and small-sized motion capturing device have been developed.

A 3D position estimating method in a space is classified into three methods, which are a method based on a camera, a method based on an ultrasonic wave, and a method based on an inertial sensor.

According to the method based on the camera, locations of markers or light sources formed in images obtained from a plurality of two-dimensional (2D) cameras are transformed into a 3D position in space. In this case, the performance is dependent on the resolution of the cameras, the size of the markers, and the like, and thus, it may be difficult to perform high precision sensing.

According to the method based on the ultrasonic wave, a distance is calculated by measuring a time of flight (TOF) corresponding to a time taken for an ultrasonic wave to travel from a transmitting unit to a receiving unit and using the fact that ultrasonic waves propagate at the speed of sound, that is, about 340 meters per second (m/s). The 3D position is calculated based on a triangulation process and the like, after obtaining at least three pieces of distance information obtained at the same point of view. The method based on the ultrasonic wave may perform a high precision sensing using a relatively less expensive device than the expensive device, such as the cameras. However, ultrasonic waves are difficult to transmit simultaneously due to inter-sound wave interference, and present a difficulty in estimating a position with respect to a moving object in real time due to a time of attenuation of an ultrasonic wave signal, that is, about 100 milliseconds (ms) taken for a distance of 3 meters (m).

According to the method based on the inertial sensor, the 3D position is calculated by integrating an acceleration component computed, based on an acceleration and a gravity acceleration, obtained through an accelerometer sensor and a gyro-sensor, and an angular velocity. However, the method based on the inertia is able to perform position estimating within a short time period (or window) and is not appropriate for long-time position estimating since errors are accumulated over time.

SUMMARY

Additional aspects and/or advantages will be set forth in part in the description which follows and, in part, will be apparent from the description, or may be learned by practice of the invention.

The foregoing and/or other aspects are achieved by providing an apparatus for estimating a position and an orientation, the apparatus including a strength-based estimating unit to estimate a strength-based position and a strength-based orientation of a remote apparatus when a plurality of strength information is received, based on an attenuation characteristic of a strength that varies based on a distance and an orientation, an inertia-based estimating unit to estimate an inertia-based position and an inertia-based orientation of the remote apparatus by receiving a plurality of inertial information, and a fusion estimating unit to estimate a fused position based on a weighted-sum of the strength-based position and the inertia-based position, and to estimate a fused orientation based on a weighted-sum of the strength-based orientation and the inertia-based orientation.

The apparatus may further include a raw data estimating unit to reversely estimate a plurality of strength information based on the fused position and the fused orientation, a noise estimating unit to estimate noise by comparing the plurality of estimated strength information and the plurality of received strength information, and a strength adjusting unit to adjust a plurality of subsequent strength information by removing the noise, and to provide the plurality of adjusted strength information to the strength-based estimating unit, and the strength-based estimating unit may estimate, based on a plurality of adjusted strength information, the strength-based position and the strength-based orientation when the plurality of adjusted strength are received.

When the weighted-sum is calculated, the fusion estimating unit may assign a relatively higher weight to the inertia-based position and the inertia-based orientation than to the strength-based position and the strength-based orientation, as a movement speed of the remote apparatus decreases.

When the weighted-sum is calculated, the fusion estimating unit may assign a relatively higher weight to the inertia-based position and the inertia-based orientation than to the strength-based position and the strength-based orientation, as a distance of the remote apparatus increases.

When the movement speed of the remote apparatus is lower than a predetermined speed while the weighted-sum is calculated, the fusion estimating unit may estimate the inertia-based position as the fused position, and may estimate the inertia-based orientation as the fused orientation.

The inertia-based estimating unit may estimate the inertia-based position and the inertia-based orientation using a variance in the plurality of inertial information based on a latest estimated fused position or a latest estimated strength-based position.

The fusion estimating unit includes performing one of estimating the strength-based position and the strength-based orientation as the fused position and the fused orientation, respectively, at a point in time in which the strength-based position and the strength-based orientation exist, and estimating the inertia-based position and the inertia-based orientation as the fused position and the fused orientation, respectively, at a point in time in which the strength-based position and the strength-based orientation are absent.

At least one of the strength-based estimating unit, the inertia-based estimating unit, and the fusion estimating unit may be configured as a Kalman Filter.

The plurality of strength information may correspond to a strength of an optical signal emitted based on a predetermined wavelength or a strength of an electromagnetic field.

The plurality of inertial information may include at least one of a tri-axial acceleration, a tri-axial gravity acceleration, and a tri-axial angular velocity measured through an inertial sensor.

The foregoing and/or other aspects are achieved by providing a method of estimating a position and an orientation, the method including estimating a strength-based position and a strength-based orientation of a remote apparatus when a plurality of strength information is received, using an attenuation characteristic of a strength that varies based on a distance and an orientation, estimating an inertia-based position and an inertia-based orientation of the remote apparatus by receiving a plurality of inertial information, and estimating a fused position by calculating a weighted-sum of the strength-based position and the inertia-based position, and estimating a fused orientation by calculating a weighted-sum of the strength-based orientation and the inertia-based orientation.

The method may further include reversely estimating a plurality of strength information based on the fused position and the fused orientation, estimating noise by comparing the plurality of estimated strength information and the plurality of received strength information, and adjusting a plurality of subsequent strength information by removing the noise, and outputting the plurality of adjusted strength information, and the estimating of the strength-based position and the strength-based orientation may include estimating the strength-based position and the strength-based orientation based on a plurality of adjusted strength information.

The foregoing and/or other aspects are achieved by providing a system of estimating a position and an orientation, the system including a transmitting apparatus including at least two transmitting units to transmit a signal for measuring a strength, a receiving apparatus including at least two receiving units to receive the signal, and to measure the strength of the signal, and outputting a plurality of strength information, a remote apparatus including an inertia sensor unit to measure a plurality of inertial information, and one of the transmitting apparatus and the receiving apparatus, and an estimating apparatus including a fused position and a fused orientation of the remote apparatus by fusing the plurality of strength information and the plurality of inertial information.

The estimating apparatus may include a strength-based estimating unit to estimate a strength-based position and a strength-based orientation of the remote apparatus when the plurality of strength information is received, based on an attenuation characteristic of a strength that varies based on a distance and orientation, an inertia-based estimating unit to estimate an inertia-based position and an inertia-based orientation of the remote apparatus by receiving the plurality of inertial information, and a fusion estimating unit to estimate the fused position based on a weighted-sum of the strength-based position and the inertia-based position, and to estimate the fused orientation based on a weighted-sum of the strength-based orientation and the inertia-based orientation.

The estimating apparatus may further include a raw data estimating unit to reversely estimate a plurality of strength information based on the fused position and the fused orientation, a noise estimating unit to estimate noise by comparing the plurality of estimated strength information and the plurality of received strength information, and a strength adjusting unit to adjust a plurality of subsequent strength information by removing the noise, and to provide the plurality of adjusted strength information to the strength-based estimating unit, and the strength-based estimating unit may estimate, based on a plurality of adjusted strength information, the strength-based position and the strength-based orientation when the plurality of adjusted strength are received.

At least three receiving units may be included in the receiving apparatus when two transmitting units are used, and at least two receiving units may be included in the receiving apparatus when three transmitting units are used.

The at least two transmitting units may have different directionalities from each other, and a predetermined angle between the directionalities may be determined in advance.

Positions and directionalities of the at least two receiving units may be determined in advance.

The at least two transmitting units may transmit the signal based on a predetermined frequency that is robust against noise, and the at least two receiving units may receive the signal using a filter through which the predetermined frequency is able to pass.

Additional aspects of embodiments will be set forth in part in the description which follows and, in part, will be apparent from the description, or may be learned by practice of the disclosure.

Example embodiments of the following description may include a method and apparatus for estimating a three-dimensional (3D) position and orientation based on a sensor fusion scheme or process that estimates a strength-based position and a strength-based orientation of a remote apparatus, based on a plurality of strength information and an attenuation characteristic of a strength that varies based on a distance and an orientation, estimates an inertia-based position and an inertia-based orientation of the remote apparatus based on a plurality of inertial information, and estimates a fused position and a fused orientation by fusing the strength-based estimation result and the inertia-based estimation result. For the sensor fusion, relatively inexpensive and small-size sensors are used, and thus, a fused sensor may be inexpensive and may have a small size, and a degree of precision of an estimated position and orientation may increase.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
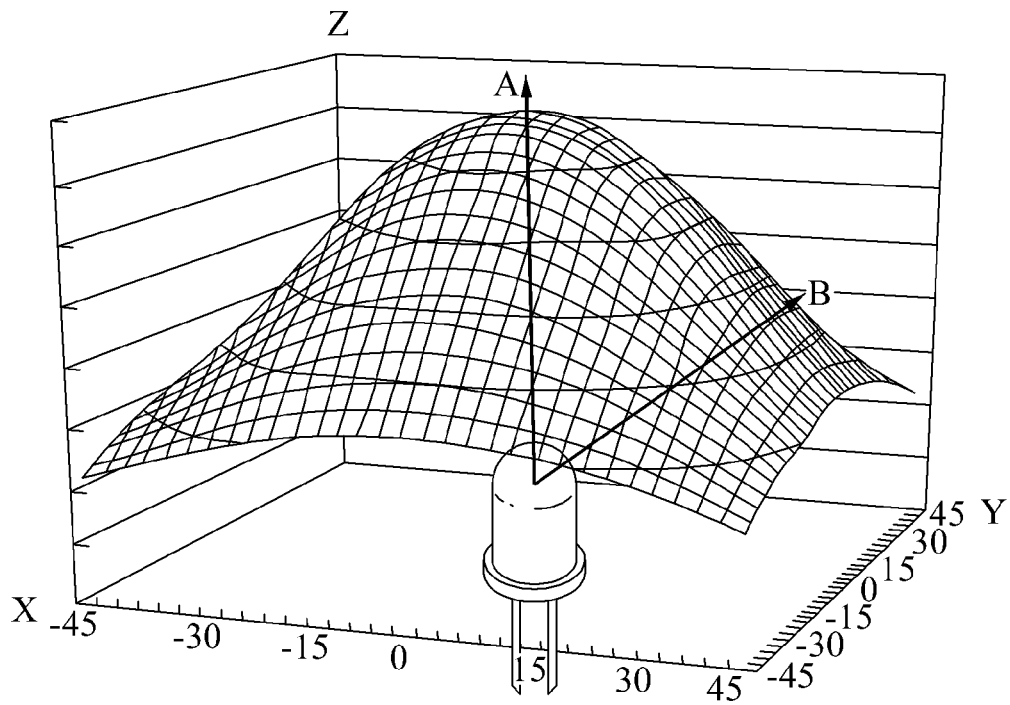
FIG. 1 illustrates a directional transmission characteristic of an infrared light of which a reception strength varies based on a directionality of an infrared light signal transmission according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

Signals have attenuation characteristics, and thus, a measured strength may vary based on a distance between a transmitting unit and a receiving unit and respective directionalities of the transmitting unit and the receiving unit. Although there are varied types of a signal having an attenuation characteristic, the embodiments will be described based on an infrared light signal.

FIG. 1 illustrates a directional transmission characteristic of an infrared light of which a reception strength varies based on a directionality of infrared light signal-transmission according to example embodiments.

Referring to FIG. 1, a reception strength of an infrared light varies based on a direction angle with respect to a transmitting unit corresponding to a directionality of the infrared light within a predetermined distance. In FIG. 1, a Z axis denotes a strength of a transmitted infrared light. Further, an X axis and a Y axis denote an angle of the transmitting unit measured from a receiving unit. Hereinafter, the directional transmission characteristic is a characteristic of an infrared light signal of which a reception strength varies based on a directionality of an infrared light signal-transmission.

Figure 2:
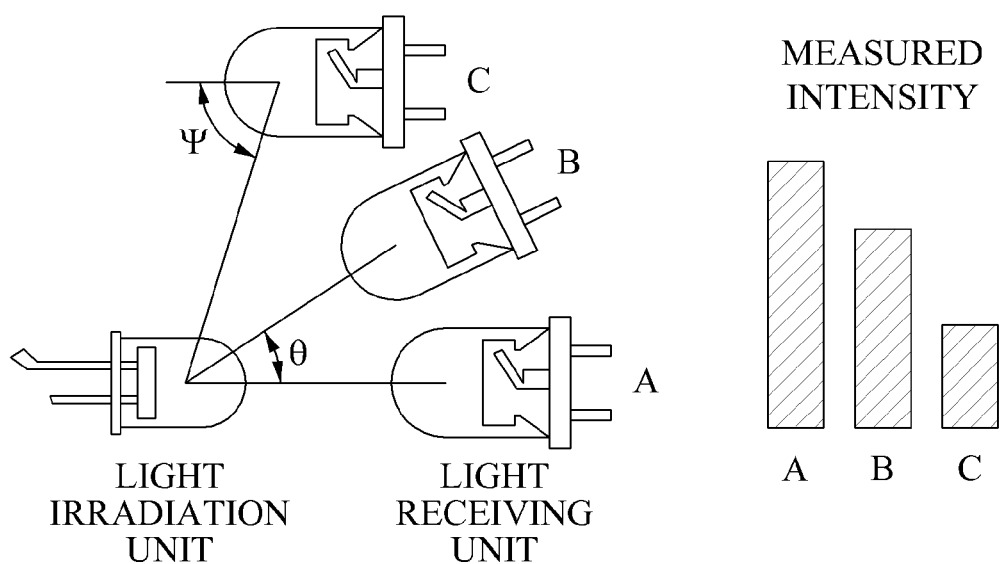
FIG. 2 illustrates a directional transmission characteristic and directional reception characteristic of an infrared light signal according to example embodiments.

FIG. 2 illustrates a directional transmission characteristic and directional reception characteristic of an infrared light signal according to example embodiments.

Referring to FIG. 2, the comparison between A and B shows that a reception strength of an infrared light varies based on a direction angle (θ) of transmission. The reception strength of an infrared light signal is an effect from a direction angle (Ψ) of reception corresponding to a direction in which a receiving unit receives an infrared light signal. Hereinafter, the directional reception characteristic is a characteristic of an infrared light of which a reception signal varies based on a directionality of infrared light-reception.

A signal strength measured based on a distance between the transmitting unit and the receiving unit has a characteristic as shown in Equation 1.

$$I \propto \frac{1}{r^2}$$ [Equation 1]

In Equation 1, I denotes a measured signal strength, and r denotes a distance between the transmitting unit and the receiving unit.

A signal strength measured based on a directionality of the transmitting unit has a characteristic as shown in Equation 2.

$$I \propto \cos(\kappa\theta)$$ [Equation 2]

In Equation 2, I denotes a measured signal strength, κ denotes a variable indicating an attenuation characteristic of the transmitting unit, and θ denotes a direction angle of the transmitting unit.

A signal strength measured based on a directionality of the receiving unit has a characteristic as shown in Equation 3.

$$I \propto \cos(\lambda\Psi)$$ [Equation 3]

In Equation 3, I denotes a measured signal strength, λ denotes a variable indicating an attenuation characteristic of the receiving unit, and Ψ denotes a direction angle of the receiving unit.

A signal strength measured based on the distance between the transmitting unit and the receiving unit, the directionality of the transmitting unit, and the directionality of the receiving unit may be expressed, as shown in Equation 4 below.

$$I = \alpha\cos(\kappa\theta) \cdot \frac{1}{r^2} \cdot \cos(\lambda\psi)$$ [Equation 4]

In Equation 4, I denotes a measured signal strength, r denotes a distance between the transmitting unit and the receiving unit, α denotes a scale factor based on characteristics of the transmitting unit and the receiving unit, κ denotes a variable indicating an attenuation characteristic of the transmitting unit, θ denotes a direction angle of the transmitting unit, λ denotes a variable indicating an attenuation characteristic of the receiving unit, and Ψ denotes a direction angle of the receiving unit.

Figure 3:
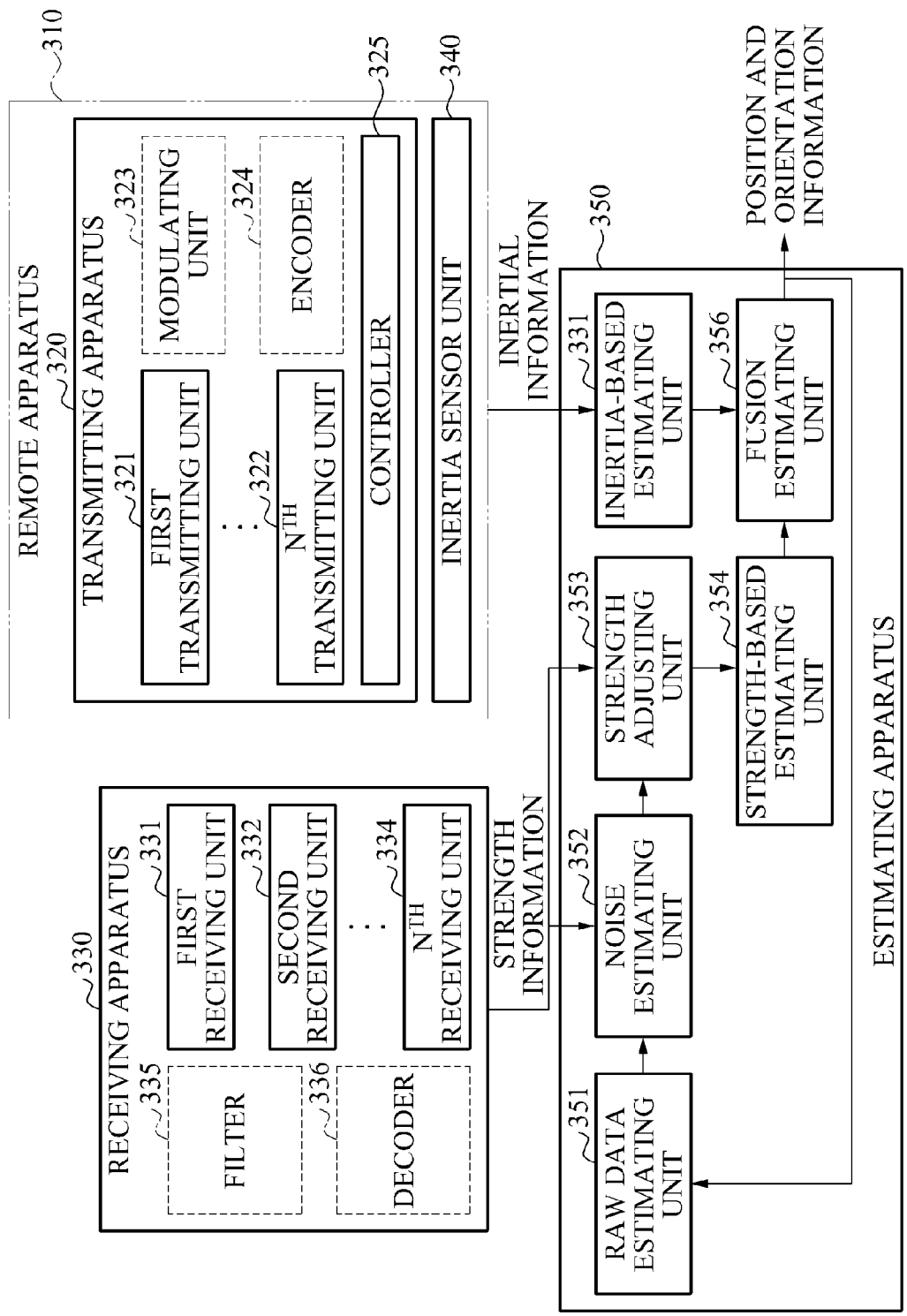
FIG. 3 illustrates a configuration of a system that estimates a three-dimensional (3D) position and orientation of a remote apparatus, based on a sensor fusion process according to example embodiments.

FIG. 3 illustrates a configuration of a system that estimates a three-dimensional (3D) position and orientation of a remote apparatus 310, based on a sensor fusion process according to example embodiments.

Referring to FIG. 3, the system that estimates the 3D position and orientation based on the sensor fusion process, may include the remote apparatus 310, a transmitting apparatus 320, a receiving apparatus 330, and an estimating apparatus 350.

The remote apparatus 310 may be a target apparatus of which position and orientation is to be estimated, and may include the transmitting apparatus 320 and an inertial sensor unit 340 to measure a plurality of inertial information. Here, the inertia sensor unit 340 may be configured to include at least one of an accelerometer sensor, a geo-magnetic sensor, and a gyro-sensor. The inertial information may include a tri-axial acceleration, a tri-axial gravity acceleration, and a tri-axial angular velocity. Even though the remote apparatus 310 of FIG. 3 includes the transmitting apparatus 320, the remote apparatus 310 may include the receiving apparatus 330 instead of the transmitting apparatus 320. That is, the remote apparatus 310 may include the transmitting apparatus 320 or the receiving apparatus 330.

The transmitting apparatus 320 may include at least one transmitting unit, for example, a first transmitting unit 321 through an $n^{th}$ transmitting unit 322, and a controller 325. In this instance, the transmitting apparatus 320 may further include a modulating unit 323 and an encoder 324.

As an example, the at least one transmitting unit may transmit a signal. When at least two transmitting units are used, directionalities of the at least two transmitting units are different from each other, and an angle between the directionalities may be determined in advance. The signal transmitted from the at least one transmitting unit may be an optical signal or an electromagnetic field. In this example, an infrared light may be a representative example of the optical signal. When the signal transmitted from the at least one transmitting unit is an optical signal, the at least one transmitting unit may be referred to as a light irradiation unit, and when the signal transmitted from the at least one transmitting unit is an electromagnetic field, the at least one transmitting unit may be referred to as an electromagnetic field transmitting unit. Hereinafter, embodiments will be described based on a case in which the at least one transmitting unit transmits an optical signal.

Here, one of the at least one transmitting units may operate as an infrared light transmitting unit of a remote controller that controls an electric device.

When a signal to be used for sensing a position and an orientation of the remote apparatus 310 and a signal corresponding to a control signal to be used for controlling an electric device are transmitted, the encoder 324 may encode the signals to be in different codes based on the function.

The modulating unit 323 may modulate a signal based on a predetermined high frequency of a carrier so that the signal is robust against light or noise around the signal. When at least two transmitting units are used, the modulating unit 323 may differently modulate signals so that signals having different frequencies are outputted from the at least two transmitting units. In this instance, a frequency is determined in advance for each transmitting unit.

The controller 325 may control the at least one transmitting unit, the modulating unit 323, and the encoder 324. For example, when at least two transmitting units are used, the controller 325 may control the at least two transmitting units to perform signal transmission, in order. In this example, the controller 325 may transmit a synchronization signal using at least one of the at least two transmitting units so that the controller 325 is synchronized with the receiving apparatus 330, before the at least two transmitting units performs signal transmission.

As another example, when the at least two transmitting units are used, the controller 325 may control the at least two transmitting units to simultaneously transmit signals having different frequencies.

The receiving apparatus 330 may include at least one receiving unit, for example, a first receiving unit 331, a second receiving unit 332, an $n^{th}$ receiving unit 334, and the like. In this instance, the receiving apparatus 330 may further include a filter 335 and a decoder 336.

The at least one receiving unit may receive a signal transmitted from at least one transmitting unit, for example, the transmitting unit 321 and the transmitting unit 322, and may measure a strength of the received signal. In this example, when at least two receiving units are used, positions and directionalities of the at least two receiving units may be determined in advance. That is, the positions and the directionalities of the at least two receiving units may be determined to be different each other.

A signal received by the at least one receiving unit may be an optical signal or an electromagnetic field. When the signal received by the at least one receiving unit is an optical signal, the at least one receiving unit may be referred to as a light receiving unit, and when the signal received by the at least one receiving unit is an electromagnetic field, the at least one receiving unit may be referred to as a magnetometer. Hereinafter, embodiments will be described based on a case in which the at least one receiving unit receives an optical signal.

When at least two transmitting units are used, the at least one receiving unit may discern the two transmitting units based on a predetermined sequence of signals being received. In this example, when the at least two transmitting units are used, the at least one receiving unit may be synchronized with the transmitting apparatus 320 upon receiving a synchronization signal, before receiving a signal from the transmitting apparatus 320.

When at least two transmitting units are used, the at least one receiving unit may separate, using a filter 335, signals having different frequencies, so as to discern the at least two transmitting units corresponding to predetermined frequencies.

The filter 335 may analyze received signals for each frequency when at least two transmitting units simultaneously transmit signals modulated based on different frequencies. In this instance, a frequency is determined in advance for each transmitting unit.

The decoder 336 may decode a signal from a transmitting unit that is able to operate as an infrared light transmitting unit of a remote controller, and may determine whether the decoded signal is a signal to be used for sensing a position and an orientation of the remote apparatus 310 or a signal corresponding to a control signal to be used for controlling an electric device. When the decoded signal is determined as the signal to be used for sensing the position and the orientation of the remote apparatus 310, the decoder 336 may provide the received signal to the estimating apparatus 350.

The estimating apparatus 350, which may be a computer, may fuse a plurality of inertial information received from the inertial sensor unit 340 and a plurality of strength information of a signal measured by the at least one receiving unit, so as to estimate a fused position and a fused orientation of the remote apparatus 310.

The estimating apparatus 350 may include a raw data estimating unit 351, a noise estimating unit 352, a strength adjusting unit 353, a strength-based estimating unit 354, an inertia-based estimating unit 355, and a fusion estimating unit 356.

The raw data estimating unit 351 may receive a fused position and a fused direction from the fusion estimating unit 356, and may reversely estimate a plurality of strength information based on the fused position and the fused orientation.

The noise estimating unit 352 may estimate noise by comparing the plurality of strength information estimated by the raw data estimating unit 351 and a plurality of strength information received from the receiving apparatus 330. That is, the noise estimating unit 352 may estimate noise by respectively subtracting the plurality of estimated strength information from the plurality of received strength information.

The strength adjusting unit 353 may adjust the plurality of received strength information by removing noise estimated using a plurality of previous strength information, and to provide the plurality of adjusted strength information to the strength-based estimating unit 354.

When the strength-based estimating unit 354 does not receive a plurality of adjusted strength information from the strength adjusting unit 353, the strength-based estimating unit 354 may receive a plurality of strength information from the receiving apparatus 330, and may estimate a strength-based position (x, y, z) and a strength-based orientation ($\phi$, $\theta$, $\Psi$) of the remote apparatus 310 based on an attenuation characteristic of a strength that varies based on a distance and a orientation.

When the strength-based estimating unit 354 receives a plurality of adjusted strength information from the strength adjusting unit 353, the strength-based estimating unit 354 may estimate, based on the plurality of adjusted strength information, the strength-based position (x, y, z) and the strength-based orientation (φ, θ, Ψ) of the remote apparatus 310.

Here, the strength-based position (x, y, z) and the strength-based orientation (φ, θ, Ψ) of the remote apparatus 310 measured by the strength-based estimating unit 354 may vary based on a number of transmitting units and a number of receiving units.

A minimum combination of transmitting units and receiving units for estimating a portion of the strength-based position (x, y, z) and the strength-based orientation (φ, θ, Ψ) is as follows: a combination of one transmitting unit and at least three receiving units, a combination of two transmitting units and at least two receiving units, and a combination of three transmitting units and at least one receiving unit.

Hereinafter, a case in which two transmitting units are used, and the remote apparatus 310 includes the transmitting apparatus 320 will be described with reference to FIG. 4.

Figure 4:
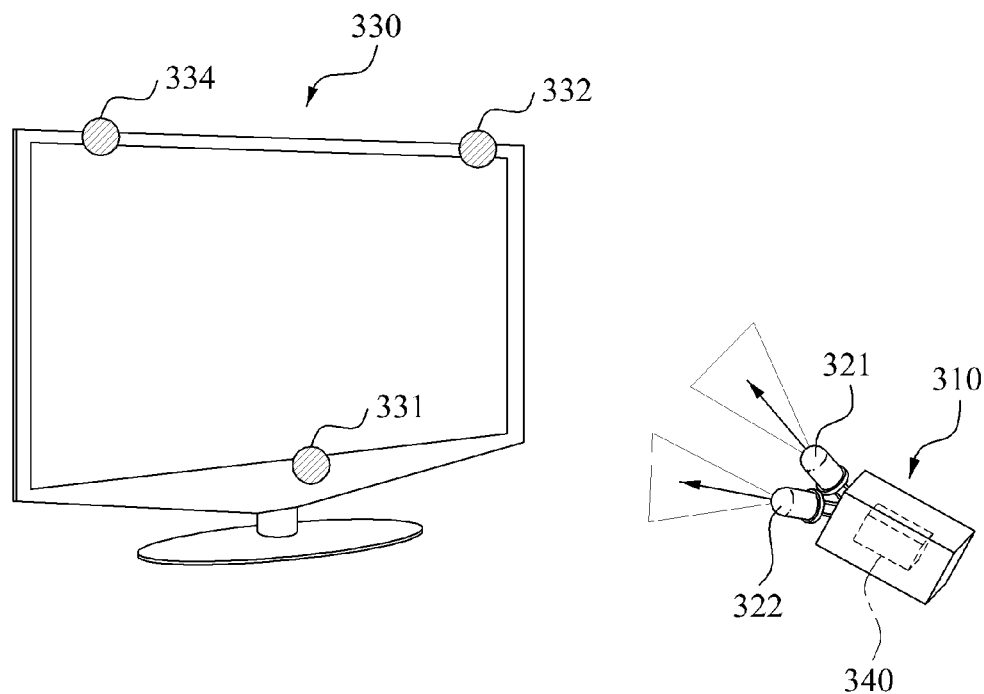
FIG. 4 illustrates a system that estimates a position and an orientation of a remote apparatus when two transmitting units are used according to example embodiments.

FIG. 4 illustrates a system that estimates a position and an orientation of the remote apparatus 310 when two transmitting units are used according to example embodiments.

The strength-based estimating unit 354 FIG. 3 may estimate a strength-based position (x, y, z) and a strength-based orientation (φ, θ, Ψ) of the remote apparatus 310, based on a direction reception characteristic, a directional transmission characteristic, and a strength of a signal received from a receiving unit, which varies based on a distance. The method of the strength-based estimating unit 354 for estimating the strength-based position and the strength-based orientation will be described with reference to FIG. 5.

Figure 5:
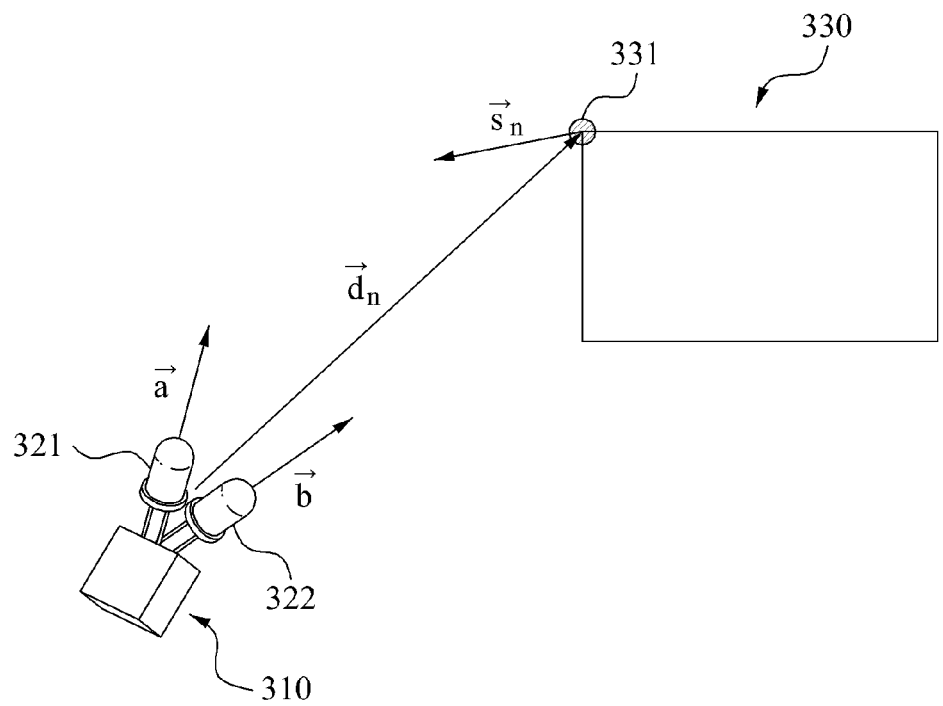
FIG. 5 illustrates parameters to be used for estimating a position and an orientation of a remote apparatus when two transmitting units are used according to example embodiments.

FIG. 5 illustrates parameters to be used for estimating a position and an orientation of the remote apparatus 310 when two transmitting units are used according to example embodiments.

Referring to FIG. 5, unit direction vectors of the first transmitting unit 321, the $n^{th}$ transmitting unit 322 (hereinafter, the second transmitting unit 322 since n is 2), and the first receiving unit 331 are defined as $\vec{a}=(x_a, y_a, z_a)$, $\vec{b}=(x_b, y_b, z_b)$ $\vec{s}_b=(x_{sn}, y_{sn}, z_{sn})$, respectively, with respect to a global coordinate system. A direction vector indicating a displacement from a transmitting unit, for example, the first transmitting unit 321, the second transmitting unit 322, to the first receiving unit 331 is defined as $\vec{d}_n=(x_{dn}, y_{dn}, z_{dn})$.

Here, an angle between $\vec{d}_n$ and $\vec{a}$, and an angle between $\vec{d}_n$ and $\vec{b}$ are $\theta_{an}$ and $\theta_{bn}$, respectively. For ease of description, when λ=1 in Equation 4, a signal strength by respective receiving units, for example, the first receiving unit 331, the second receiving unit 332, the $n^{th}$ receiving unit 334, and the like, may be expressed as shown in Equation 5 and Equation 6.

$$I_{na} = \alpha \cos\left(\kappa \cos^{-1}\left(\frac{\vec{a} \cdot \vec{d}}{|\vec{d}|}\right)\right) \cdot \frac{1}{|\vec{d}|^2} \cdot \frac{-\vec{s}_n \cdot \vec{d}}{|\vec{d}|} \quad \text{[Equation 5]}$$

In Equation 5, $I_{na}$ denotes a signal strength of a signal transmitted from the first transmitting unit 331 and received by the $n^{th}$ receiving unit.

$$I_{nb} = \alpha \cos\left(\kappa \cos^{-1}\left(\frac{\vec{b} \cdot \vec{d}}{|\vec{d}|}\right)\right) \cdot \frac{1}{|\vec{d}|^2} \cdot \frac{-\vec{s}_n \cdot \vec{d}}{|\vec{d}|} \quad \text{[Equation 6]}$$

In Equation 6, $I_{nb}$ denotes a signal strength of a signal transmitted from the second transmitting unit 322 and received by $n^{th}$ receiving unit.

When signals from the two transmitting units are sequentially received in a short interval or received at different frequencies, information associated with Equation 5 and information associated with Equation 6 are obtained, independently. Accordingly, each receiving unit may obtain or use two equations.

When three receiving units are used, six equations associated with a strength-based position and a strength-based orientation of the remote apparatus 310 may be obtained or used.

When $\vec{a}$, $\vec{b}$, and $\vec{d}_n$ are calculated, both the position and the orientation may also be calculated and thus, when nine values of unknowns, that is, components of respective direction vectors, are calculated, the position and the orientation may be determined. In this example, $\vec{a}$ and $\vec{b}$ are unit vectors having a length of "1", and a relative position relationship between $\vec{a}$ and $\vec{b}$ is given in advance and thus, three additional equations are obtained.

Accordingly, nine values of unknowns may be calculated using the nine equations, based on an optimization process. In this example, when a number of receiving units increases, a normalization process that minimizes an error may be used.

When two transmitting units are used, the strength-based position (x, y, z) and the strength-based orientation (φ, θ, Ψ) measured by the strength-based estimating unit 354 may vary, based on the number of receiving units, as shown in Table 1. Here, x, y, and z correspond to 3D coordinates, φ denotes a roll based on a z axis, θ denotes a pitch based on an x axis, and Ψ denotes a yaw based on a y axis.

TABLE 1

| Number of used units | | Remote apparatus | | | | | |
|---|---|---|---|---|---|---|---|
| | | Strength-based position | | | Strength-based orientation | | |
| Transmitting units | Receiving Units | x | y | z | Φ | θ | ψ |
| 2 | 3 | ○ | ○ | ○ | ○ | ○ | ○ |
| 2 | 2 | ○ | ○ | x | x | ○ | ○ |

Referring to Table 1, when two transmitting units and three receiving units are used, the strength-based estimating unit 354 may estimate a 3D strength-based position (x, y, z) of the remote apparatus 310 and a tri-axial orientation of the remote apparatus 310, that is, roll (φ), pitch (θ), and yaw (Ψ).

Under the opposite case, that is, when three transmitting units and two receiving units are used, the strength-based estimating unit 354 may estimate the 3D strength-based position (x, y, z) of the remote apparatus 310 and the tri-axial orientation of the remote apparatus 310, that is, roll (φ), pitch (θ), and yaw (Ψ).

Referring to FIG. 1, when two transmitting units and two receiving units are used and roll (φ) is fixed among the three axes, the strength-based estimating unit 354 may estimate a 2D strength-based position (x, y) and a 2D orientation pitch (θ) and yaw (Ψ) of the remote apparatus 310.

The inertia-based estimating unit 355 may estimate an inertia-based position of the remote apparatus 310 and an inertia-based orientation of the remote apparatus 310 by receiving a plurality of inertial information measured by the inertia sensor unit 340.

The inertia-based position estimated by the inertia-based estimating unit 355 may be estimated using a variance in the plurality of inertial information received based on a latest fused position estimated by the fusion estimating unit 356 or a latest strength-based position estimated by the strength-based estimating unit 354. In this example, an error may be accumulated when the inertia-based estimating unit 355 estimates a position. Accordingly, as a movement of the remote apparatus 310 is or becomes less and a point in time of estimating a position is or becomes nearer to a point in time of measuring a reference position, the position is more accurately measured.

The fusion estimating unit 356 may estimate a fused position based on a weighted-sum of a strength-based position and an inertia-based position, and may estimate a fused orientation based on a weighted-sum of a strength-based orientation and an inertia-based orientation.

When the weighted-sum is calculated, the fusion estimating unit 356 may assign a relatively higher weight to the inertia-based position and the inertia-based orientation than to the strength-based position and the strength-based orientation, as a movement speed of the remote apparatus 310 decreases.

When the weighted-sum is calculated, the fusion estimating unit 356 may assign a relatively higher weight to the inertia-based position and the inertia-based orientation than to the strength-based position and the strength-based orientation, as a distance of the remote apparatus 310 increases.

When the movement speed of the remote apparatus 310 is almost not detected, that is, when the movement speed is lower than a predetermined speed while (or when) the weighted-sum is calculated, the fusion estimating unit 356 may estimate the inertia-based position as the fused position, and estimate the inertia-based orientation as the fused orientation.

The fusion estimating unit 356 may estimate the strength-based position and the strength-based orientation as the fused position and the fused orientation, respectively, at a point in time in which the strength-based position and the strength-based orientation exist, and may estimate the inertia-based position and the inertia-based orientation as the fused position and the fused orientation, respectively, at a point in time in which the strength-based position and the strength-based orientation are absent.

The estimating apparatus 350 may estimate the inertia-based position and the inertia-based orientation, based on a plurality of inertial information received from the inertia sensor unit 340, and may fuse the estimated inertia-based position and the inertia-based orientation with the strength-based position and the strength-based orientation so as to obtain an adjusted position and orientation. Also, the estimating apparatus 350 may directly obtain the fused position and the fused orientation by providing a plurality of strength information received from the receiving apparatus 330 and a plurality of inertial information received from the inertia sensor unit 340 as inputs of a Kalman Filter.

Here, the Kalman Filter may be an algorithm that predicts a state of a linear system so as to minimize a probable error. That is, the Kalman Filter denotes an algorithm that estimates an optimal value through recursive data processing using a past value and a current value.

Hereinafter, a method of estimating a 3D position and orientation of a remote apparatus, based on a sensor fusion process, will be described.

Figure 6:
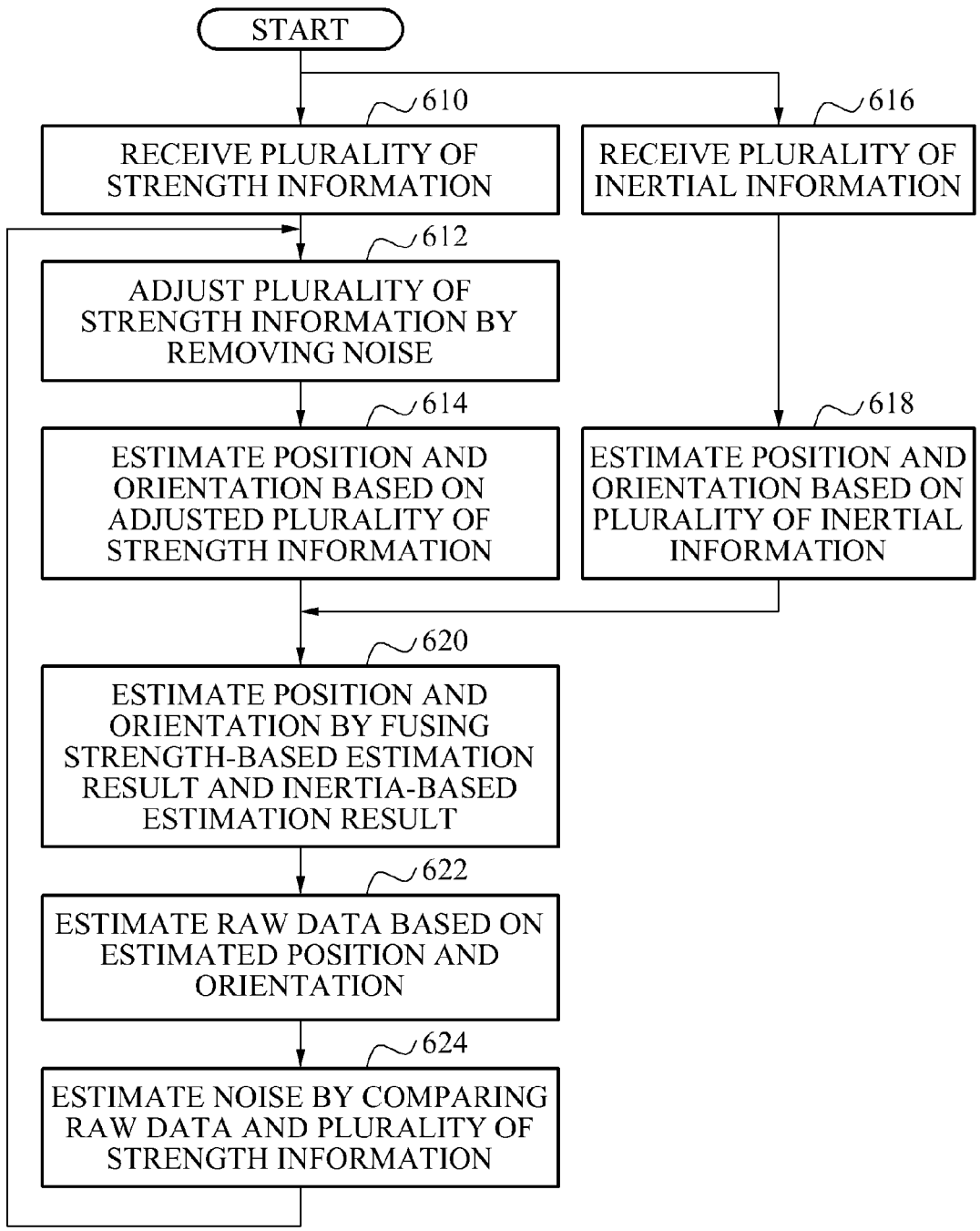
FIG. 6 illustrates an operational method of estimating a 3D position and orientation of a remote apparatus, based on a sensor fusion process according to example embodiments.

FIG. 6 illustrates an operational method of estimating a 3D position and orientation of a remote apparatus, based on a sensor fusion process according to example embodiments.

In operation 610, the estimating apparatus 350 may receive a plurality of strength information.

In operation 612, the estimating unit 350 may adjust the plurality of strength information by removing noise estimated using a plurality of previous strength information.

In operation 614, the estimating apparatus 350 may estimate a strength-based position of the remote apparatus 310 and a strength-based orientation of the remote apparatus 310, based on the plurality of adjusted strength information and an attenuation characteristic of a strength that varies based on a distance and an orientation.

In operation 616, the estimating apparatus 350 may receive a plurality of inertial information when the plurality of strength information is received in operation 610.

In operation 618, the estimating apparatus 350 estimates an inertia-based position and an inertia-based orientation, based on the plurality of inertial information.

In operation 620, the estimating apparatus 350 may fuse a result of the strength-based estimation and a result of the inertia-based estimation so as to estimate a fused position of the remote apparatus 310 and a fused orientation of the remote apparatus 310.

In operation 622, the estimating apparatus 350 may estimate raw data by reversely estimating a plurality of strength information based on the fused position and the fused orientation.

In operation 624, the estimating apparatus 350 may estimate noise by comparing the raw data corresponding to the plurality of estimated strength information and the plurality of received strength information.

Although embodiments have been shown and described, it would be appreciated by those skilled in the art that changes may be made in these embodiments without departing from the principles and spirit of the disclosure, the scope of which is defined by the claims and their equivalents

What is claimed is:

1. An apparatus for estimating a position and an orientation, the apparatus comprising:
a strength-based estimating processor configured to estimate a strength-based position and a strength-based orientation of a remote apparatus in response to a plurality of strength information being received, based on an attenuation characteristic of a strength that varies based on a distance and an orientation;
an inertia-based estimating processor configured to estimate an inertia-based position and an inertia-based orientation of the remote apparatus by receiving a plurality of inertial information; and
a fusion estimating processor configured to:
in response to a decrease in a movement speed of the remote apparatus or an increase in a distance from the remote apparatus to a receiving apparatus, assign a greater weight to the inertia-based position than a weight assigned to the strength-based position and assign a greater weight to the inertia-based orientation than a weight assigned to the strength-based orientation,
estimate a fused position based on a weighted-sum of the strength-based position and the inertia-based position,
estimate a fused orientation based on a weighted-sum of the strength-based orientation and the inertia-based orientation, and in response to the movement speed of the remote apparatus being lower than a predetermined speed, estimate the fused position to be the inertia-based position and the fused orientation to be the inertia-based orientation; and
a strength adjusting processor configured to adjust, based on the fused position and the fused orientation, a plurality of subsequently received strength information,
wherein the plurality of strength information corresponds to a strength of a first optical signal, of a first frequency, emitted from a first transmitter and a strength of a second optical signal, of a second frequency, emitted from a second transmitter, and
wherein the first and second transmitters have different directionalities from each other, a predetermined angle between the directionalities is determined in advance, and the first and second optical signals are emitted simultaneously.

2. The apparatus of claim 1, further comprising:
a raw data estimating processor configured to estimate a new plurality of strength information based on the fused position and the fused orientation;
a noise estimating processor configured to estimate noise by comparing the plurality of estimated strength information and the plurality of received strength information, wherein
the strength adjusting processor is further configured to adjust the plurality of subsequently received strength information by removing the noise, and to provide the plurality of adjusted subsequently received strength information to the strength-based estimating processor, and
wherein the strength-based estimating processor is configured to estimate, based on the plurality of adjusted strength information, the strength-based position and the strength-based orientation in response to the plurality of adjusted strength information being received.

3. The apparatus of claim 1, wherein the fusion estimating processor is configured to calculate the weighted-sums by assigning the weight to the strength-based position and the strength-based orientation and assigning the greater weight to the inertia-based position and the inertia-based orientation, as the movement speed of the remote apparatus decreases.

4. The apparatus of claim 1, wherein the fusion estimating processor is configured to calculate the weighted-sums by assigning the weight to the strength-based position and the strength-based orientation and assigning the greater weight to the inertia-based position and the inertia-based orientation, as the distance from the remote apparatus to the receiving apparatus increases.

5. The apparatus of claim 1, wherein the inertia-based estimating processor is configured to estimate, based on a latest estimated fused position or a latest estimated strength-based position, the inertia-based position and the inertia-based orientation using a variance in the plurality of inertial information.

6. The apparatus of claim 5, wherein the fusion estimating processor is configured to:
estimate the strength-based position and the strength-based orientation as the fused position and the fused orientation, respectively, at a point in time in which the strength-based position and the strength-based orientation exist; and
estimate the inertia-based position and the inertia-based orientation as the fused position and the fused orientation, respectively, at a point in time in which the strength-based position and the strength-based orientation are absent.

7. The apparatus of claim 1, wherein at least one of the strength-based estimating processor, the inertia-based estimating processor, and the fusion estimating processor is configured as a Kalman Filter.

8. The apparatus of claim 1, wherein the plurality of inertial information includes at least one of a tri-axial acceleration, a tri-axial gravity acceleration, and a tri-axial angular velocity measured through an inertial sensor.

9. The apparatus of claim 1, wherein a minimum combination of transmitters and receivers for estimating a portion of the strength-based position and the strength-based orientation comprises at least:
a combination of one transmitter and at least three receivers, a combination of two transmitters and at least two receivers, or a combination of three transmitters and at least one receiver.

10. A method of estimating a position and an orientation, the method comprising:
estimating, using a processor, a strength-based position and a strength-based orientation of a remote apparatus in response to a plurality of strength information being received, using an attenuation characteristic of a strength that varies based on a distance and an orientation;
estimating, using the processor, an inertia-based position and an inertia-based orientation of the remote apparatus by receiving a plurality of inertial information;
in response to a decrease in a movement speed of the remote apparatus or an increase in a distance from the remote apparatus to a receiving apparatus, assigning a greater weight to the inertia-based position than a weight assigned to the strength-based position and assigning a greater weight to the inertia-based orientation than a weight assigned to the strength-based orientation;
estimating, using the processor, a fused position by calculating a weighted-sum of the strength-based position and the inertia-based position;
estimating, using the processor, a fused orientation by calculating a weighted-sum of the strength-based orientation and the inertia-based orientation;
in response to the movement speed of the remote apparatus being lower than a predetermined speed, estimating the fused position to be the inertia-based position and the fused orientation to be the inertia-based orientation; and
adjusting, based on the fused position and the fused orientation, a plurality of subsequently received strength information,
wherein the plurality of strength information corresponds to a strength of a first optical signal, of a first frequency, emitted from a first transmitter and a strength of a second optical signal, of a second frequency, emitted from a second transmitter, and
wherein the first and second transmitters have different directionalities from each other, a predetermined angle between the directionalities is determined in advance, and the first and second optical signals are emitted simultaneously.

11. The method of claim 10, further comprising:
reversely estimating a plurality of strength information based on the fused position and the fused orientation;

estimating noise by comparing the plurality of estimated strength information and the plurality of received strength information; and wherein the adjusting of the plurality of subsequently received strength information comprises removing the noise, and outputting the plurality of adjusted subsequently received strength information, and wherein the estimating of the strength-based position and the strength-based orientation comprises:

estimating the strength-based position and the strength-based orientation based on a plurality of adjusted strength information.

12. The method of claim 10, wherein the calculating of the weighted-sums comprises assigning a weight to the strength-based position and the strength-based orientation and a greater weight to the inertia-based position and the inertia-based orientation, as the movement speed of the remote apparatus decreases.

13. The method of claim 10, wherein the calculating of the weighted-sums comprises assigning a weight to the strength-based position and the strength-based orientation and a greater weight to the inertia-based position and the inertia-based orientation, as the distance from the remote apparatus to the receiving apparatus increases.

14. The method of claim 10, wherein the plurality of inertial information include at least one of a tri-axial acceleration, a tri-axial gravity acceleration, and a tri-axial angular velocity measured through an inertial sensor.

15. A system of estimating a position and an orientation, the system comprising:

a transmitting apparatus comprising a first transmitter and a second transmitter configured to transmit a signal for measuring a strength;

a receiving apparatus comprising at least two receivers configured to receive the signal, and to measure the strength of the signal, and outputting a plurality of strength information;

a remote apparatus comprising an inertia sensor unit configured to measure a plurality of inertial information, and one of the transmitting apparatus and the receiving apparatus;

an estimating processor configured to estimate a fused position and a fused orientation of the remote apparatus by fusing the plurality of strength information and the plurality of inertial information; and a strength adjusting processor configured to adjust, based on a fused position and a fused orientation, a plurality of subsequent strength information output by the receiving apparatus, wherein the estimating processor comprises a fusion estimating processor configured to:

in response to a decrease in a movement speed of the remote apparatus or an increase in a distance from the remote apparatus to the receiving apparatus, assign a greater weight to the inertia-based position than a weight assigned to the strength-based position and assign a greater weight to the inertia-based orientation than a weight assigned to the strength-based orientation, estimate the fused position based on a weighted-sum of a strength-based position and an inertia-based position, estimate the fused orientation based on a weighted-sum of a strength-based orientation and an inertia-based orientation, and estimate, in response to the movement speed of the remote apparatus being lower than a predetermined speed, the fused position to be the inertia-based position and the fused orientation to be the inertia-based orientation, wherein the plurality of strength information corresponds to a strength of a first optical signal, of a first frequency, emitted from the first transmitter and a strength of a second optical signal, of a second frequency, emitted from the second transmitter, and wherein the first and second transmitters have different directionalities from each other, a predetermined angle between the directionalities is determined in advance, and the first and second optical signals are emitted simultaneously.

16. The system of claim 15, wherein the estimating processor comprises:

a strength-based estimating processor configured to estimate the strength-based position and the strength-based orientation of the remote apparatus in response to the plurality of strength information being received, based on an attenuation characteristic of a strength that varies based on a distance and orientation; and an inertia-based estimating processor configured to estimate the inertia-based position and the inertia-based orientation of the remote apparatus by receiving the plurality of inertial information.

17. The system of claim 16, wherein:

the estimating processor further comprises:

a raw data estimating processor configured to estimate a new plurality of strength information based on the fused position and the fused orientation;

a noise estimating processor configured to estimate noise by comparing the plurality of estimated strength information and the plurality of received strength information, wherein the strength adjusting processor is configured to adjust a plurality of subsequent strength information by removing the noise, and to provide the plurality of adjusted strength information to the strength-based estimating processor, wherein the strength-based estimating processor is configured to estimate, based on a plurality of adjusted strength information, the strength-based position and the strength-based orientation in response to the plurality of adjusted strength are received.

18. The system of claim 15, wherein:

at least three receivers are included in the receiving apparatus in response to two transmitters being used, and at least two receivers are included in the receiving apparatus in response to three transmitters being used.

19. The system of claim 15, wherein positions and directionalities of the at least two receivers are determined in advance.

20. The system of claim 15, wherein:

the at least two transmitters are configured to transmit the signal based on a predetermined frequency that is robust against noise, and the at least two receivers are configured to receive the signal using a filter through which the predetermined frequency is able to pass.

21. The apparatus of claim 15, wherein, in response to using the at least two transmitters, the at least one receiver is configured to synchronize with the transmitting apparatus upon receiving a synchronization signal, before receiving a signal from the transmitting apparatus.

* * * * *